US009352234B2

(12) United States Patent
Curtis et al.

(10) Patent No.: US 9,352,234 B2
(45) Date of Patent: May 31, 2016

(54) PLAYER RANKINGS BASED ON LONG TERM OPPONENT ACTIVITY (71) Applicant: Google Inc., Mountain View, CA (US)

(72) Inventors: Duncan John Curtis, Castro Valley, CA (US); Alexander Ruben Stacey McCarthy, San Francisco, CA (US)

(73) Assignee: GOOGLE INC., Mountain View, CA (US)

( * ) Notice: Subject to any disclaimer, the term of this patent is extended or adjusted under 35 U.S.C. 154(b) by 83 days.

(21) Appl. No.: 14/212,523

(22) Filed: Mar. 14, 2014

(65) Prior Publication Data
US 2015/0258453 A1   Sep. 17, 2015

(51) Int. Cl.
A63F 13/12      (2006.01)
A63F 13/798     (2014.01)
A63F 13/795     (2014.01)

(52) U.S. Cl.
CPC ............ *A63F 13/798* (2014.09); *A63F 13/795* (2014.09)

(58) Field of Classification Search
USPC .......................................................... 463/42
See application file for complete search history.

(56) References Cited

U.S. PATENT DOCUMENTS

| 7,614,955 | B2 | 11/2009 | Farnham et al. | |
| 7,846,024 | B2 | 12/2010 | Graepel et al. | |
| 8,157,653 | B2 | 4/2012 | Buhr | |
| 2007/0077985 | A1* | 4/2007 | Walker et al. | 463/20 |
| 2007/0191102 | A1 | 8/2007 | Coliz et al. | |
| 2008/0311979 | A1* | 12/2008 | Walker et al. | 463/25 |
| 2009/0131151 | A1* | 5/2009 | Harris | G07F 17/32 463/22 |
| 2012/0014673 | A1* | 1/2012 | O'Dwyer | G06F 3/0346 386/282 |
| 2012/0149461 | A1* | 6/2012 | Walker | G07F 17/32 463/25 |
| 2014/0004960 | A1 | 1/2014 | Soti et al. | |
| 2014/0025732 | A1 | 1/2014 | Lin et al. | |
| 2015/0066636 | A1* | 3/2015 | Sanders | G06Q 30/0246 705/14.45 |
| 2015/0202529 | A1* | 7/2015 | Paradise | A63F 13/12 463/31 |

OTHER PUBLICATIONS

Delalleau, Olivier et al.,"Beyond Skill Rating: Advanced Matchmaking in Ghost Recon Online", IEEE Transactions on Computational Intelligence and AI in Games, (vol.: 4 , Issue: 3 ), Sep. 2012.
Riegelsberger, Jens et al.,"Personality Matters: Incorporating Detailed User Attributes and Preferences into the Matchmaking Process", 40th Annual Hawaii International Conference on System Sciences, 2007. HICSS 2007. Jan. 2007.

* cited by examiner

*Primary Examiner* — Pierre E Elisca
(74) *Attorney, Agent, or Firm* — Morris & Kamlay LLP (57) ABSTRACT

Systems, device and techniques are disclosed for rating a multiplayer videogame active player based on the retention of one or more qualifying players after their interaction with the active player. An interaction event between an active player and a qualifying player may be detected and a retention value based on the qualifying player returning to the multiplayer videogame may be determined. The active player may be rated based at least on the retention value of the qualifying player.

38 Claims, 5 Drawing Sheets

Fig. 5

PLAYER RANKINGS BASED ON LONG TERM OPPONENT ACTIVITY

BACKGROUND

Traditionally, videogame players are rated based on the results for individual instances of games they play or based on votes by other players. As an example, player A may be the highest rated player in a multiplayer videogame based on having the best win to loss ratio when compared to other players that also participate in the multiplayer videogame. Alternatively, as an example, after each instance of a multiplayer videogame, the players that participated in the instance of the game may vote for the other players that were included in the game. Here, an individual player's rating may be based on all the multi-player videogame instances that the player participated in and the votes she received from other players participating in those instances. Such traditional rating techniques are not generally indicative of a players contributions to the ecosystem on the whole and may make it difficult to identify players who are compatible with other players. It may also be difficult to identify players who are good matches with other players.

BRIEF SUMMARY

According to implementations of the disclosed subject matter, a first interaction event (e.g., participation in the same instance of a multiplayer videogame, communication between players within a multiplayer videogame, participation on the same team or different teams within a multiplayer videogame, etc.) within a multiplayer videogame may be detected and may be between an active player and a qualifying player. A retention value for the qualifying player may be determined, and may be based on the qualifying player returning to the multiplayer videogame after the interaction event. The active player may be rated based at least on the retention value of the qualifying player and may be rated based on the retention value of multiple qualifying players. The retention value for a given qualifying player may be weighted based on the number of interactions a qualifying player has with the active player, the amount of time a qualifying player has been playing the multiplayer videogame, or the like.

According to implementations of the disclosed subject matter, a systems and devices for rating a player may include means for detecting an interaction event, within a multiplayer videogame, between an active player and a qualifying player. The system includes means for determining a retention value for the qualifying player, the retention value based on the qualifying player returning to the multiplayer videogame after the interaction event. Means for rating the active player based at least on the retention value of the qualifying player may be provided.

Systems and techniques according to the present disclosure enable rating a player based on the retention value for other players after the other players interact with the player. Additional features, advantages, and implementations of the disclosed subject matter may be set forth or apparent from consideration of the following detailed description, drawings, and claims. Moreover, it is to be understood that both the foregoing summary and the following detailed description include examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Techniques disclosed herein may enable rating an active player of a multiplayer videogame based on the retention of other players (herein, qualifying players) that the active player interacts with. The interaction, as disclosed herein, between an active player and a qualifying player may be detected. As an example, a first player A may play a multiplayer game with multiple other players including a second player B. The game may consist of two teams such that the first player A and the second player B are on the same team. The first player A may interact with the second player B such that they may share a common goal for their team to garner more points than the opponent team B. A retention value for a qualifying player may be determined and may be based on the qualifying player returning to play a multiplayer game subsequent to the interaction between the active player and the qualifying player. Continuing the previous example, the instance of the multiplayer game where the first player A and the second player B are on the same team may conclude. Subsequent to the conclusion of the instance of the multiplayer game, the second player B may return to play in a different instance of the multiplayer game, after one week. The retention value for the second player B may be calculated based on the return of the second player after one week. An active player may be rated based at least on the retention value of a qualifying player. Continuing the previous example, the retention value associated with the second player B returning after one week may be 2. The first player A may be rated based on the retention value for the second player B and, additionally, may be rated based on the retention of additional players that interacted with the first player A. As disclosed herein, an active player may be rated based on the active player's rating. As an example, the first player A with a rating of 2 may be ranked higher than a third player C with a rating of 1.

A multiplayer videogame may be any applicable videogame where two or more players can play in the same environment. The two or more players may play at the same time or at different times. As an example of two or more players playing at the same time, two or more players may play a strategic game at the same time where a first player is an opponent of the second player and the goal for the first player is to obtain more points than the second player within a given amount of time. As an example or two or more players playing at a different time, two or more players may be on the same team and each team may be required to complete a set of tasks, the completion of the tasks indicating the conclusion of the team's turn. A first player from the team may complete her task at 5:00 pm and a second player from the team may complete her task at 7:00 pm. Each player in a multiplayer game may conduct individual single player activities and may interact with an artificial intelligence built into the multiplayer videogame to conduct the interactions. Two or more players within a multiplayer videogame may interact with each other as self-interested parties, in partnership, or as opponents of each other (e.g., in competition or in rivalry). Two or more players in partnership may work cooperatively with each other to achieve a common goal, supervise other players' activities, or to engage in a combination of activities. Examples of multiplayer videogames can include massively multiplayer online game (MMO or MMOG, deathmatch, team deathmatch, player versus player (PPV), team player versus averment (PvE), capture the flag, domination, competition for resources, cooperative gameplay, defensive gameplay, or the like. A multiplayer videogame may require multiple players to share the resources of a single game system or use network based technology to play with each other.

An active player may be any player that a rating and/or ranking is associated with, according to the techniques disclosed herein. As an example, each player that participates in a multiplayer videogame may be an active player and may have a rating and/or ranking associated with the player. An active player may be an active player relative to qualifying players (as disclosed herein). An active player may be a human player or an artificial intelligence player. An example of an artificial intelligence player be a bot that supports a human player while the human player plays a multiplayer videogame. The bot active player may have attributes associated with the bot active player (e.g., helpfulness, kindness, etc.) and may be rated based on the retention values corresponding to qualifying players that interact with the bot active player.

A qualifying player may be any player in a multiplayer videogame that is not an active player for the purposes of rating/ranking an active player. It will be understood that a single player may be both an active player (for rating/ranking) and a qualifying player (for determining a rate/rank for an active player. As an example, a player A may be an active player and may be rated/ranked based on the retention values of other players that interact with player A. Player A may also be a qualifying player such that the retention value associated with player A is used to rate/rank a player B.

An instance of a multiplayer videogame may be a specific game that multiple players play, a world that multiple players play in (such that they can interact with each other), where an action made by one player may be viewed by or may have an effect of the gameplay of a second player, or the like. An example of an instance of a multiplayer videogame can include a given game world where actions of players included in that world can be viewed by or effect other players in that game world. Another example of an instance of a multiplayer videogame can include a section of a given world where actions of players included in that section of the game world can be viewed by or effect other players in that section of that game world.

Figure 3:
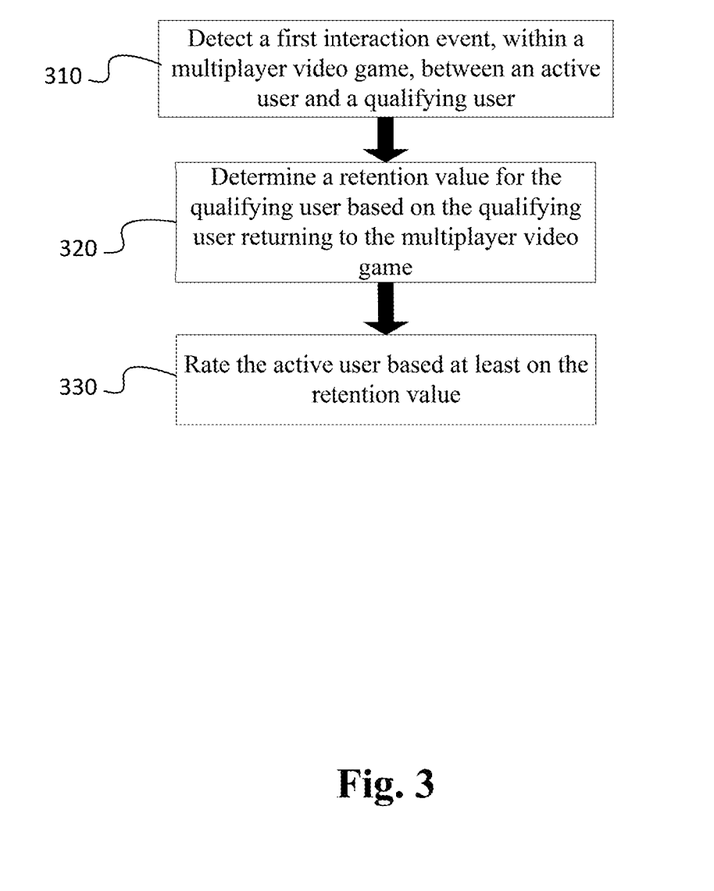
FIG. 3 shows an example process for rating a player based on a retention value, according to an implementation of the disclosed subject matter.

According to implementations of the disclosed subject matter, as shown at step 310 in FIG. 3, an interaction event may be detected within a multiplayer videogame. The interaction event may be an interaction between an active player and a qualifying player within an instance of the multiplayer videogame. As disclosed herein, an instance of a multiplayer videogame may be a specific game that multiple players play, a world that multiple players play in (such that they can interact with each other), where an action made by one player may be viewed by or may have an effect of the gameplay of a second player, or the like.

The interaction event may correspond to communication between an active player and a qualifying player within a multiplayer videogame. The communication may be auditory communication such as, for example, if the active player uses a microphone to speak in a manner that at least the qualifying player may hear the active player. Alternatively or in addition, the communication may be text based such as, for example, if the active player inputs text using any applicable text input device (e.g., keyboard, mouse selection, gamepad, touchpad, etc.). The text input provided by the active player may be received by the qualifying player on the same screen that the qualifying player is playing the multiplayer videogame on, a secondary screen, a mobile device, or the like. As an example, an active player may input "Hide!" using a gamepad and the qualifying player may see the text "Hide!" on the corner of the screen which the qualifying player is using to play the multiplayer videogame. Alternatively or in addition, the communication may be visual such as, for example, the active player may direct an avatar within the multiplayer videogame using a gamepad. The avatar may make a motion to follow him such that the avatar making the motion is seen by the qualifying player.

The interaction event may correspond to the active player and the qualifying player participating as members of the same team within a multiplayer videogame. A team may be any applicable grouping of players such as to achieve a common goal, supervise other players' activities, to engage in a combination of activities, or the like. It will be understood that there need not be an opposing team or even multiple teams for an active player and a qualifying player to participate as members of the same team. As an example of participation on the same team, an active player and qualifying player may play a first person combat game and may be grouped such that the goal for both the active player and the qualifying player is to defeat a different group of players. According to this example, actions taken by the active player that benefit the group that the active player is in can be considered beneficial for the qualifying player as the qualifying player is in the same group.

The interaction event may correspond to the active player and the qualifying player participating as members of different teams within a multiplayer videogame. A team may be any applicable grouping of players such as to achieve a common goal, supervise other players' activities, to engage in a combination of activities, or the like. As an example of participation on different teams, an active player and qualifying player may play a first person combat game and may be grouped such that the goal for the active player is to defeat the group that includes the qualifying player and vice versa. According to this example, actions taken by the active player that benefit the group that the active player is in can be considered detrimental for the qualifying player as well as the qualifying player is in the same group. It will be understood that although the active player and the qualifying player are on different teams, they may not necessarily be opponents. Two or more teams may, for example, share a common goal and the active player and qualifying player may be participants of those different teams.

According to implementations of the disclosed subject matter, as shown at step 320 in FIG. 3, a retention value for the qualifying player may be determined based on the qualifying player returning to the multiplayer video game. The retention value may be an indication of how soon, often, and/or for how long a qualifying player plays the video game. According to the techniques disclosed herein, the retention value may provide an indication of the influence an active player has on causing a qualifying player to return to play the multiplayer videogame. Essentially, if qualifying players tend to return to play a multiplayer videogame after interacting with a specific active player, then that player may be designated as a player that is conducive to retention. The retention value may be based on the time, frequency, and/or duration of return of a qualifying player. As an example, a higher retention value may be assigned to a qualifying player that returns to play a multiplayer video game within 1 day after interacting with an active player. A lower retention value may be assigned to the qualifying player if the qualifying player returns to play the multiplayer video game after 4 days after interacting with the active player. As another example, a higher retention value may be assigned to a qualifying player that returns to play a multiplayer videogame 5 times after interacting with an active player. A lower retention value may be assigned to the qualifying player if the qualifying player returns to play the multiplayer video game only one time after interacting with the active player.

Figure 5:
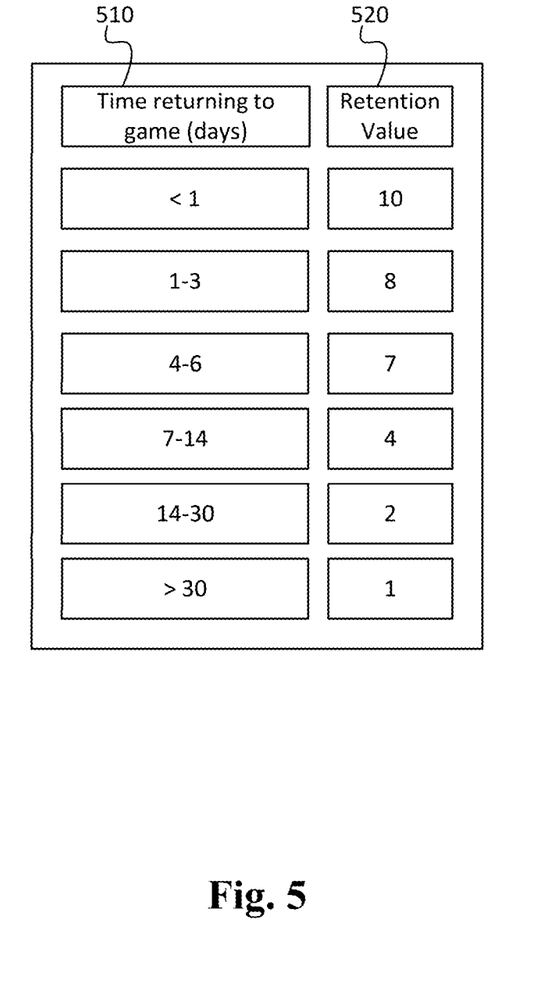
FIG. 5 shows an example illustration of time associated with retention values, according to an implementation of the disclosed subject matter.

The retention value may be determine based on the qualifying player returning to the multiplayer videogame within a threshold time period. The threshold time period may be any applicable time denomination such as a minute, hour, day, week, month, year, or the like. Generally, a higher retention value may be associated with a smaller amount of time. As an illustrative example of retention values based on time, FIG. 5 shows a column 510 corresponding of the number of days elapsed since an interaction and when a user returns to play a multiplayer videogame. A second column 520 shows retention values corresponding to the number of days/ranges of dates listed in the column 510. For example, a lower number of days (e.g., <1) results in a higher retention value (i.e., 10) whereas a higher number of days (e.g., 7-14) results in a lower retention value (i.e. 4). Essentially, the techniques disclosed herein may utilize time based thresholds to determine retention values.

The retention value for a qualifying player may be specific to the qualifying player such that the qualifying player only has one retention value. For example, a qualifying player D may interact with an active player E and, subsequently receive a retention value of 8 based on returning to play the video game within 8 days. That retention value of 8 may be applied for the qualifying player D regardless of who she interacts with. Alternatively, the retention value for a qualifying player may be based on the qualifying player and an active player such that the retention value for a qualifying player F when related to an active player G may be 7 whereas the retention value for the qualifying player F when related to an active player H may be 4. More specifically, the qualifying player F may interact with the active player G and may return to play the multiplayer video game within 4 days. Based on returning to play in 4 days, the retention value for the qualifying player F when related to active player G may be 7. Similarly, the qualifying player F may interact with the active player H and may return to play the multiplayer video game within 8 days. Based on returning to play in 8 days, the retention value for the qualifying player F when related to active player H may be 4. It will be understood that although the examples disclosed herein show a qualifying player interacting with a first active player distinctly from a different active player, the actual interactions may overlap and, thus, a retention value calculation may be made by factoring in the overlap.

According to an implementation of the disclosed subject matter, as shown at step 330 in FIG. 3, an active player may be rated based at least on a retention value. The rating may be the same as the retention value for a qualifying player that interacts with the active player, may be based on multiple retention values for multiple qualifying players, and/or based on any other applicable factor such as player history, play rank, or the like. Additionally, the rating may be adjusted based on any applicable factor such as a normalization (e.g., based on the highest rating), a ratio, a weight, or the like.

Multiple players with ratings based on retention may be ranked relative to each other. The rankings may be across all players of the multiplayer video game or may be for a subset of players that play the multiplayer video game (e.g., all players located in Asia). A rating and/or ranking may be used to match a player with another player. As an example, a player with a high rating may be matched with a new player of the multiplayer video game as the higher rating may indicate that the player matched with the new player is more likely to retain the new player such that the new player comes back and plays the multiplayer videogame after interacting with the player.

Figure 4A:
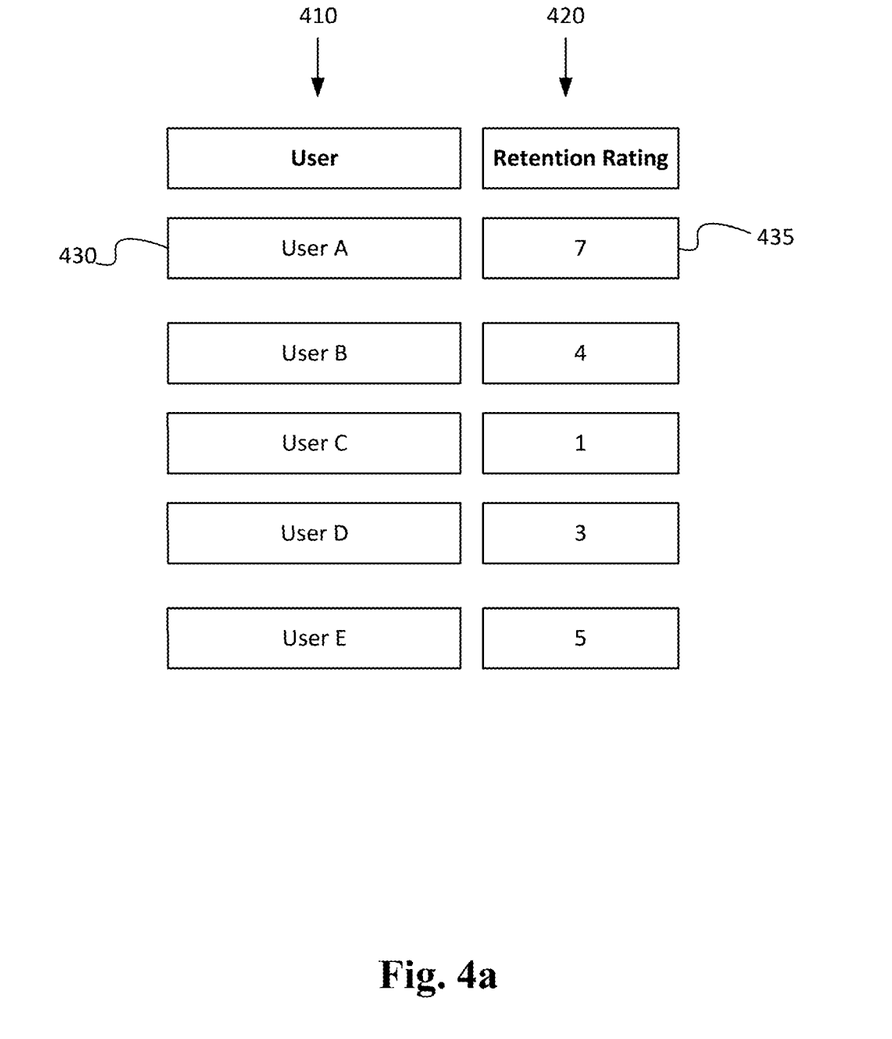
FIG. 4a shows an example illustration of user retention ratings, according to an implementation of the disclosed subject matter.
Figure 4B:
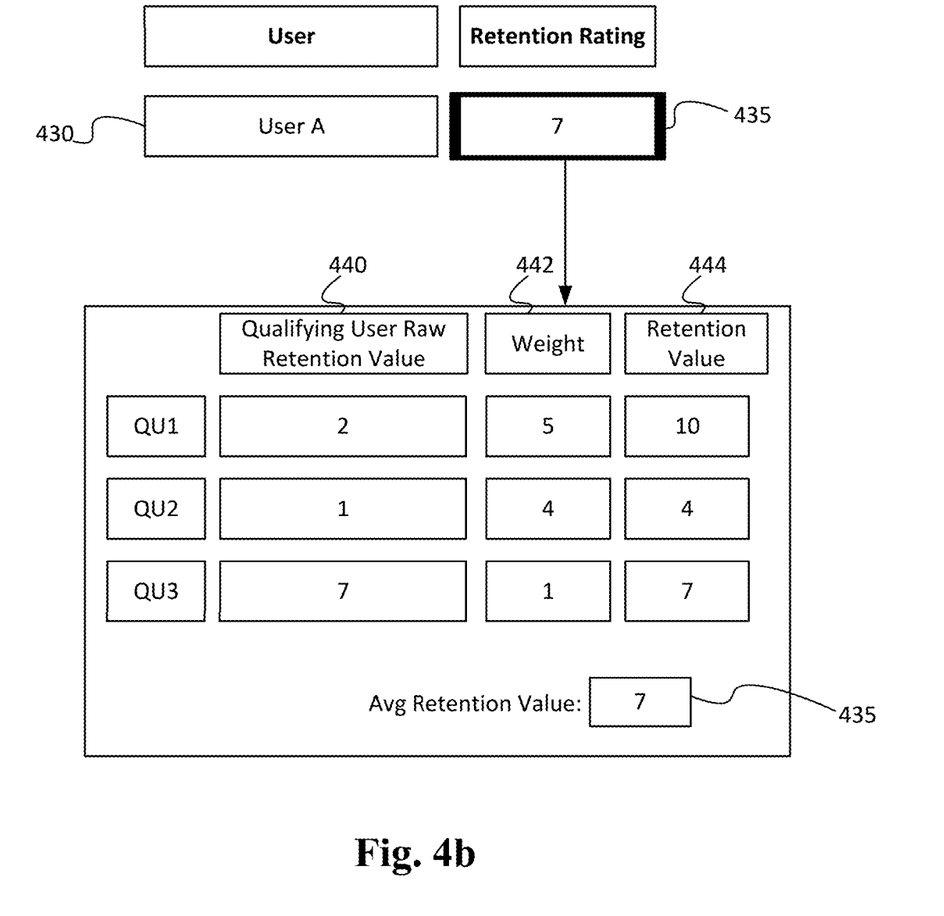
FIG. 4b shows an example illustration of deriving a retention rating, according to an implementation of the disclosed subject matter.

FIG. 4a shows an illustrative example of multiple users, listed in the user column 410, and corresponding retention ratings for the users in column 420. As a specific example, User A 430 may have a retention rating of seven as listed in box 435. FIG. 4b shows an example calculation for User A's rating of seven 435. As shown, the User A's rating may be based on three qualifying users QU1, QU2, and QU3. QU1 may have a qualifying user raw retention value of 2, QU2 of 1, and QU3 of 7. The raw retention value may correspond to each qualifying user's retention based on interaction with User A. For example, FIG. 5 shows retention values corresponding to the amount of time a qualifying user takes to return to the multiplayer video game. Accordingly, QU1's raw retention value of 2 may be a result of QU2 returning to play the multiplayer videogame after 15 days, QU2's value of 1 may be a result of QU1 returning to play the videogame after 32 days, and QU3's value of 7 as a result of QU3 returning to play the game after 6 days. As disclosed herein, weights may be applied to retention values (e.g., raw retention values) in order to determine a qualifying user's retention value. According to this example, QU1 may have a weight of 5, QU2 of 4, and QU3 of 1 such that when multiplied with the respective raw retention values, QU1's retention value may be 10, QU2's 4 and QU3's 7. The three individual retention values may be averaged such that User A's rating is determined to be 7 (i.e., (10+4+7)/3=7).

According to an implementation of the disclosed subject matter, retention values may be weighted based on one or more criteria such as the experience of a qualifying player, the number of times the qualifying player interacts with an active player, actions of the qualifying player after initiating interaction with the active player (e.g., making in-app purchases, referring other players to join the multiplayer video game, etc.). The experience of a qualifying player may be factored when determining a weight for the qualifying player such that the raw retention value for a player that is new to the multiplayer video game may be weighted higher when compared to the weight for a more experienced player. Essentially, the effect that an active player has on the retention of a new player may be given more weight. Such a weighing scheme may be beneficial as newer players of a multiplayer video game may be more influenced by active players than more experienced players who may have already determined their return behavior. Accordingly, the return behavior for a new player may be a better indicator of the influence an active player has on other players. A player experience amount may be based on how long the player has been playing the multiplayer video game and may be measured in any applicable manner such as number of hours, days, weeks, months, or the like. Alternatively or in addition, the experience of a player may be measured by the number of times that the player has played the multiplayer videogame and/or for how long (e.g., total hours) the player has spent playing the multiplayer videogame.

A weight may be determined based on the number of times a qualifying player interacts with an active player such that a higher number of interactions may cause the qualifying player's retention value associated with the active player to be higher. As an example, if an active player J interacts with a qualifying player K a first time, then the weight used to determine the retention value for qualifying player K based on the interaction with active player J may be 1. If active player J interacts with qualifying player K for a second time, then the weight may be increased to 2. Increasing the weight based on the number of interactions between an active player and a qualifying player may be beneficial as if an active player has more interactions with a qualifying player, the active player may be that much more influential in the return of the qualifying player to the videogame.

According to an implementation of the disclosed subject matter, a player with a retention rating below a given threshold may be designated as an observed player. An observed player's gameplay options may be limited, she may be reported to a developer or a manager that manages players, or the like. As an example, when the retention rating for a player X drops below a threshold value, the rating can be reported to a developer along with the communication history for player X. The developer may determine that player X is abusive towards other players, and the abuse is resulting in a lower player retention. Accordingly, the developer may prohibit player X from participating in the multiplayer video game based on the determination.

Figure 1:
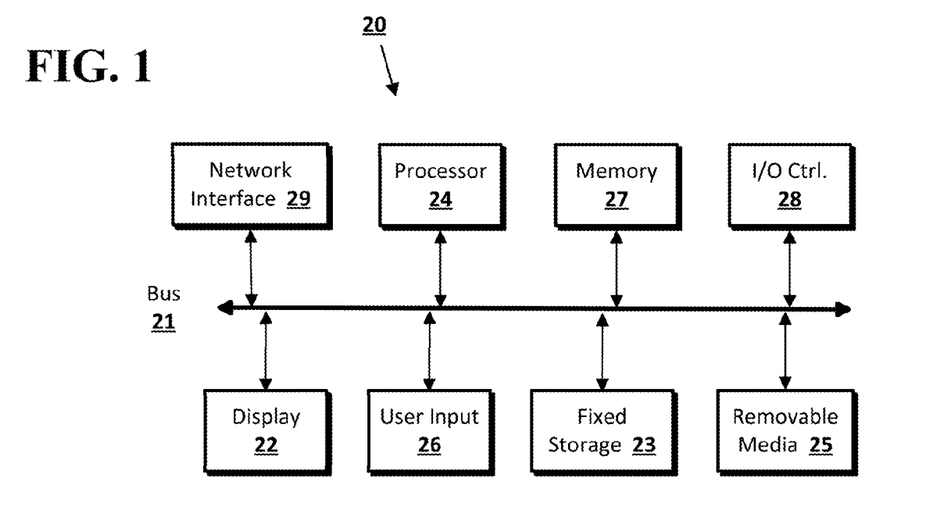
FIG. 1 shows a computer according to an implementation of the disclosed subject matter.

Implementations of the presently disclosed subject matter may be implemented in and used with a variety of component and network architectures (e.g., online network that enables multiplayer gameplay). FIG. 1 is an example computer 20 (e.g., a game console, desktop gaming machine, etc.) suitable for implementing implementations of the presently disclosed subject matter. Alternatively, any device disclosed herein configured to electronically transport, generate, or modify data or information may utilize a computer. The computer (e.g., microcomputer) 20 includes a bus 21 which interconnects major components of the computer 20, such as a central processor 24, a memory 27 (typically RAM, but which may also include ROM, flash RAM, or the like), an input/output controller 28, a player display 22, such as a display or touch screen via a display adapter, a player input interface 26, which may include one or more controllers and associated player input or devices such as a keyboard, mouse, WiFi/cellular radios, touchscreen, microphone/speakers and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 20 can be stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 2.

Many other devices or components (not shown) may be connected in a similar manner (e.g., document scanners, digital cameras and so on). Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, removable media 25, or on a remote storage location.

Figure 2:
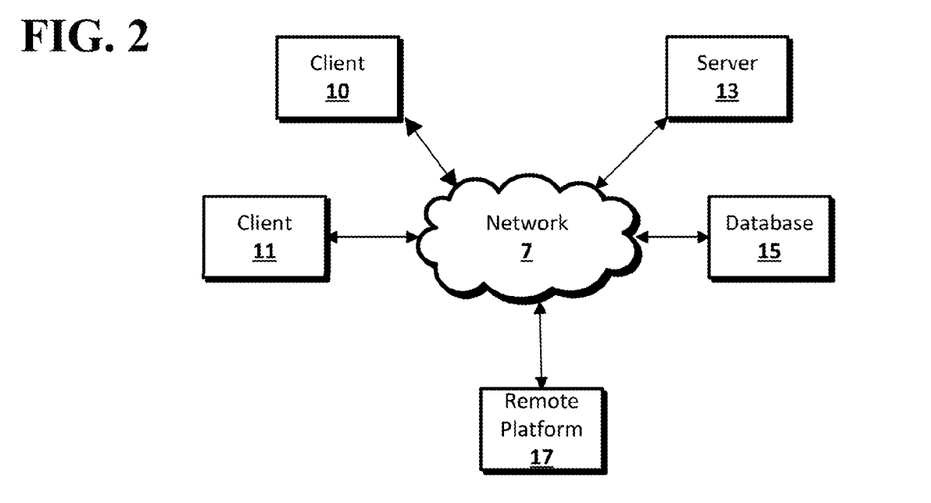
FIG. 2 shows a network configuration according to an implementation of the disclosed subject matter.

FIG. 2 shows an example network arrangement according to an implementation of the disclosed subject matter. One or more clients 10, 11, such as smart power devices, microcomputers, local computers, smart phones, tablet computing devices, and the like may connect to other devices via one or more networks 7 (e.g., a power distribution network). The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A method comprising:
   detecting, by a server, a first interaction event, within a multiplayer video game being executed by the server, between an active player and a qualifying player from respective user devices;
   determining, by the server, a retention value for the qualifying player, the retention value based on the qualifying player returning to the multiplayer video game that is executed by the server, after the interaction event;
   rating, by the server, the active player based at least on the retention value of the qualifying player.

2. The method of claim 1, wherein the first interaction event corresponds to the active player and the qualifying player participating in the same instance of a multiplayer video game.

3. The method of claim 1, wherein the first interaction event corresponds to communication between the active player and the qualifying player, within a multiplayer video game.

4. The method of claim 1, wherein the first interaction event corresponds to the active player and the qualifying player participating as members of the same team within a multiplayer video game.

5. The method of claim 1, wherein the first interaction event corresponds to the active player and the qualifying player participating as members of different teams within a multiplayer video game.

6. The method of claim 1, wherein the retention value is further based on the qualifying player returning to the multiplayer video game within a threshold time period.

7. The method of claim 6, wherein the threshold time period is one selected from the group consisting of: a minute, an hour, a day, a week, a month, and a year.

8. The method of claim 1, wherein the retention value for the qualifying player is weighted higher if the qualifying player returned to the multiplayer video game sooner than later.

9. The method of claim 1, wherein the retention value is further based on the number of times the qualifying player returns to the multiplayer video game within a threshold time period.

10. The method of claim 1, wherein the retention value is further based on the duration for which the qualifying player returns to the multiplayer video game.

11. The method of claim 1, wherein the rating is based on the retention value of multiple players.

12. The method of claim 1, wherein the active player is one selected from: a human player and a bot player.

13. The method of claim 1, further comprising;
    ranking, by the server, the active player based on the rating.

14. The method of claim 1, further comprising:
    detecting, by the server, a second interaction event between the active player and the qualifying player;
    weighing, by the server, the retention value for the qualifying player higher based on detecting the second interaction event; and
    rating, by the server, the active player based at least on the higher weighted retention value of the qualifying player.

15. The method of claim 1, further comprising:
    determining, by the server, that the qualifying player is a new player based on a new player threshold;
    weighing, by the server, the retention value for the qualifying player higher based on determining that the qualifying is a new player; and
    rating, by the server, the active player based at least on the higher weighted retention value of the qualifying player.

16. The method of claim 15, wherein the new player threshold is one selected from the group consisting of: a number of hours, a number of days, a number of weeks, a number of months, a number of plays, and a duration of play.

17. The method of claim 1, further comprising;
    matching, by the server, an unmatched player with the active player based on the rating.

18. The method of claim 1, wherein the active player is more favorably rated for a higher retention value than for a lower retention value.

19. The method of claim 1, further comprising:
    determining, by the server, that the active player's rating is below a threshold; and
    designating, by the server, the active player as an observed player based on the determination.

20. A system comprising:
    a processor of a server configured to:
        detect a first interaction event, within a multiplayer video game executed by the server, between an active player and a qualifying player from respective user devices;
        determine a retention value for the qualifying player, the retention value based on the qualifying player returning to the multiplayer video game, after the interaction event;
        rate the active player based at least on the retention value of the qualifying player.

21. The system of claim 20, wherein the first interaction event corresponds to the active player and the qualifying player participating in the same instance of a multiplayer video game.

22. The system of claim 20, wherein the first interaction event corresponds to communication between the active player and the qualifying player, within a multiplayer video game.

23. The system of claim 20, wherein the first interaction event corresponds to the active player and the qualifying player participating as members of the same team within a multiplayer video game.

24. The system of claim 20, wherein the first interaction event corresponds to the active player and the qualifying player participating as members of different teams within a multi-player video game.

25. The system of claim 20, wherein the retention value is further based on the qualifying player returning to the multiplayer video game within a threshold time period.

26. The system of claim 25, wherein the threshold time period is one selected from the group consisting of: a minute, an hour, a day, a week, a month, and a year.

27. The system of claim 20, wherein the retention value for the qualifying player is weighted higher if the qualifying player returned to the multiplayer video game sooner than later.

28. The system of claim 20, wherein the retention value is further based on the number of times the qualifying player returns to the multiplayer video game within a threshold time period.

29. The system of claim 20, wherein the retention value is further based on the duration for which the qualifying player returns to the multiplayer video game.

30. The system of claim 20, wherein the rating is based on the retention value of multiple players.

31. The system of claim 20, wherein the active player is one selected from: a human player and a bot player.

32. The system of claim 20, wherein the processor of the server ranks the active player based on the rating.

33. The system of claim 20, wherein the processor of the server is further configured to:
  detect a second interaction event between the active player and the qualifying player;
  weigh the retention value for the qualifying player higher based on detecting the second interaction event; and
  rate the active player based at least on the higher weighted retention value of the qualifying player.

34. The system of claim 20, wherein the processor of the server is further configured to:
  determine that the qualifying player is a new player based on a new player threshold;
  weigh the retention value for the qualifying player higher based on determining that the qualifying is a new player; and
  rate the active player based at least on the higher weighted retention value of the qualifying player.

35. The system of claim 34, wherein the new player threshold is one selected from the group consisting of: a number of hours, a number of days, a number of weeks, a number of months, a number of plays, and a duration of play.

36. The system of claim 20, wherein the processor of the server is further configured to match an unmatched player with the active player based on the rating.

37. The system of claim 20, wherein the active player is more favorably rated for a higher retention value than for a lower retention value.

38. The system of claim 20, wherein the processor of the server is further configured to:
  determine that the active player's rating is below a threshold; and
  designate the active player as an observed player based on the determination.

* * * * *